March 17, 1931. A. C. TIMPTE 1,796,583
COMBINED BODY BRACE AND SEAT SUPPORT
Filed Sept. 11, 1930
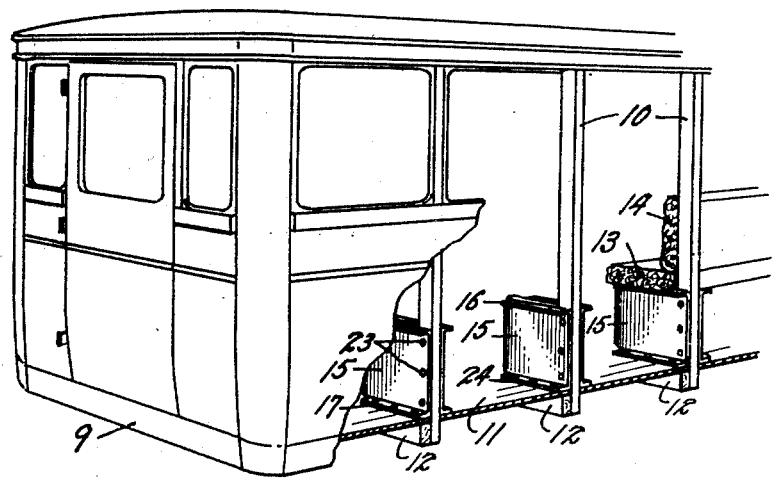
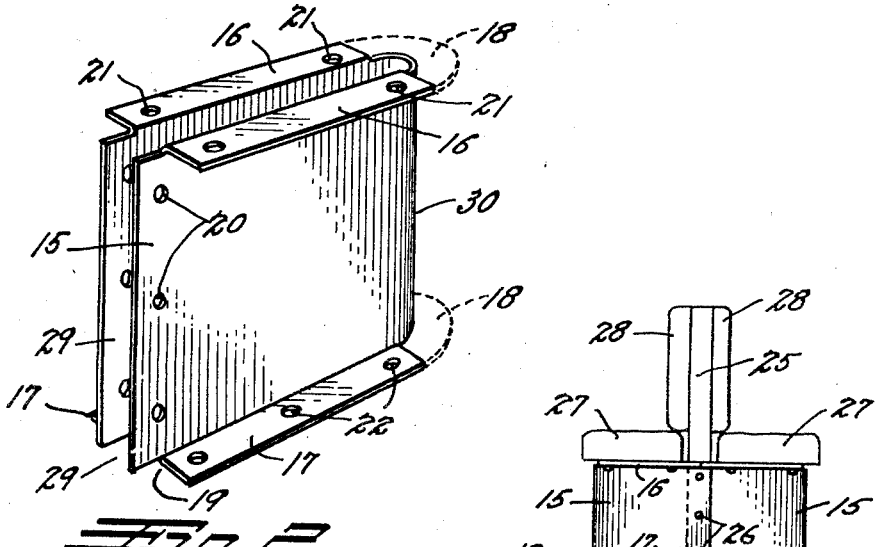
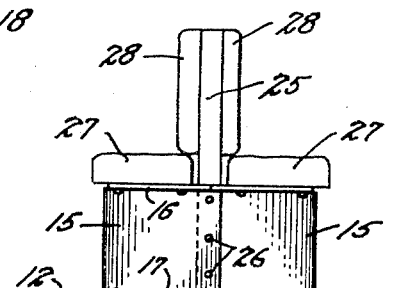
Inventor
ANTON C. TIMPTE
By
Attorney Patented Mar. 17, 1931

1,796,583

UNITED STATES PATENT OFFICE

ANTON C. TIMPTE, OF DENVER, COLORADO

COMBINED BODY BRACE AND SEAT SUPPORT

Application filed September 11, 1930. Serial No. 481,155.

This invention relates to a combined body brace and seat support for automobile bus bodies and the like, and has for its principal object the provision of a device for this purpose which will be light in weight, exceedingly rigid and ornamental in appearance, and which will act as a brace for the upright posts of the body so as to maintain them in the upright positions and also as a support for the seats.

Other objects and advantages reside in the detail construction of the invention which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary perspective view illustrating a typical bus body with the invention applied thereto.

Fig. 2 is a detail perspective view of a preferred form of the invention.

Fig. 3 is an end elevation of a double or back-to-back seat, illustrating the application of the invention thereto.

The invention is particularly applicable to a bus body of the type commonly known as a "school bus." School busses are usually constructed with longitudinal seats. Some such busses have a seat along each side, others have an additional double or back-to-back seat down the middle so as to provide four longitudinal seats. A typical school bus is illustrated at 9 in Fig. 1, with its vertical posts at 10; floor at 11; floor beams at 12; seat cushion at 13 and seat back at 14.

The combined body brace and seat support member is designated in its entirety by the numeral 15 and comprises a single piece of sheet metal bent back upon itself so as to have a narrow U-shaped cross section with a rounded front edge 30 and an open rear 29. The open rear has a width substantially equal to the width of the vertical post 10. Top flanges 16 are projected outwardly at each side of the top of the member 15 and bottom flanges 17 are similarly formed at each side of the bottom thereof. The flanges 16 are stamped or bent from the same sheet of metal forming the member 15.

To facilitate the bending or forming of the member 15, the flanges 16 and 17 may be cut away so as not to extend around the curved end 30. If desired, however, the flanges may be continued entirely around the rounded edge of the sheet as shown in broken line at 18. The latter construction is possibly more solid and more ornamental than the former. It greatly increases the manufacturing cost, however, so it is preferred to eliminate the rounded flanges 18. The flanges, however, should be cut away as shown at 19 so as to stop short of the straight edge of the member 15 for reasons which will be later described.

The vertical edges of the member 15 are provided with a series of bolt holes 20; the top flanges with bolt holes 21; and the bottom flanges with bolt holes 22.

In use, the members 15 are secured to the vertical posts 10 by passing their open edges 29 over the posts, as shown in Fig. 1, and securing them by means of bolts 23 passed through the bolt holes 20 and through the posts 10. The bottom flanges 17 are secured to the floor 11 by means of bolts 24 passed through the bolt holes 22. In the usual body the floor beams 12 will come directly under one of the flanges 17 so that the bolts 24 may, if desired, be passed into or through the floor beams.

When thus attached, the member 15 acts in the nature of a gusset plate to both firmly lock the vertical members 10, the floor 11 and the floor beams 12 together and to also maintain them rigidly in their desired positions and prevent side sway of the body.

It is also desired to call attention to the fact that since the members 15 are bolted to the floor by two spaced apart rows of bolts, one in each of the flanges 17, they also act to brace the body in a longitudinal direction so as to prevent forward and back sway thereof.

The top flanges 16 are employed for supporting the seat bottom or cushion 13, which is secured thereon by means of bolts passed through the bolt holes 21.

Should it be desired to place a double center seat in the body the members 15 are arranged as shown in Fig. 3 so as to support vertical seat posts 25. In this use the seat post 25 is passed into the open edge 20 of one of the members 15. A second member 15 is then overlapped over the first. To allow this overlapping is the purpose of cutting back the flanges, as shown at 19, Fig. 2. Bolts 26 are then passed through the overlapped members 15 to clamp them to the seat post 25 and to each other and the bottom flanges 17 are secured to the floor through the bolt holes 22. Seat cushions as shown at 27 can then be bolted or screwed to the top flanges 16 and seat backs 28 secured to the seat post 25. Of course, if but a single seat of this type is desired the members 15 on one side of the posts 25 can be eliminated. The latter construction is used in buses of the type where cross seats are desired instead of longitudinal seats.

In addition to bracing the post 10 from side sway the members 15 also serve to stiffen and reduce the bending in the posts owing to the fact that they enclose and are clamped to two of the post sides for a portion of the length thereof.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:—

1. In a bus body having a vertical post and a floor, means for bracing said post from said floor and supporting a seat comprising: a sheet metal plate bent backward upon itself so as to form an open edge, said open edge having a width substantially equal to said post so as to pass on each side of the latter; top flanges turned outwardly at each side of the top of said member and bottom flanges turned outwardly at each side of the bottom of said member, said top and bottom flanges and said open side being perforated so as to secure said member to said seat, floor and post, respectively.

2. A combined body brace and seat support for bus bodies comprising: a single plate of sheet metal bent back upon itself to form a member having a relatively narrow U-shaped cross section; a rounded front edge on said member; an open rear edge on said member; top flanges turned outwardly along the top edge of said member; bottom flanges turned outwardly along the bottom edge of said member, said top and bottom flanges being provided with bolt openings and said open side being provided with aligned bolt openings so as to allow the two faces of said member to be clamped against a post passed through said open side.

In testimony whereof, I affix my signature.

ANTON C. TIMPTE.